US006390152B1

United States Patent
Donovan et al.

(10) Patent No.: US 6,390,152 B1
(45) Date of Patent: May 21, 2002

(54) MODULAR BULK MATERIAL HANDLING STATION

(75) Inventors: John K. Donovan, Florence; Eugene R. Brown; Ronald W. Bennett, both of Bennettsville, all of SC (US)

(73) Assignee: Aluminum Ladder Company, Florence, SC (US)

( * ) Notice: Subject to any disclaimer, the term of this patent is extended or adjusted under 35 U.S.C. 154(b) by 0 days.

(21) Appl. No.: 09/723,763

(22) Filed: Nov. 27, 2000

(51) Int. Cl.⁷ .................................................. B65B 3/00
(52) U.S. Cl. ..................... 141/279; 141/98; 141/382; 141/387; 182/1; 182/51; 182/115; 182/131; 137/615
(58) Field of Search ......................... 141/98, 279, 382, 141/387–389; 182/1, 51, 115, 130, 131, 141, 145; 137/615

(56) References Cited

U.S. PATENT DOCUMENTS

| | | | | |
|---|---|---|---|---|
| 2,982,379 A | * | 5/1961 | Fisher ........................ | 182/115 |
| 3,460,592 A | * | 8/1969 | Sackett, Sr. ................. | 141/98 |
| 3,536,109 A | * | 10/1970 | Ginsburgh ................... | 141/98 |
| 3,799,217 A | * | 3/1974 | Bauer ......................... | 141/387 |
| 4,013,140 A | * | 3/1977 | Pradon ......................... | 182/1 |
| 4,422,485 A | * | 12/1983 | O'Shea et al. ................ | 141/98 |
| 4,679,657 A | * | 7/1987 | Bennett et al. ............... | 182/131 |
| 5,042,612 A | | 8/1991 | Bennett et al. ................ | 182/1 |
| 5,392,878 A | | 2/1995 | Bennett et al. ............... | 182/115 |
| 5,715,906 A | * | 2/1998 | Abe ........................... | 182/141 |
| 6,098,751 A | * | 8/2000 | Eichenlaub et al. ......... | 182/130 |
| 6,186,195 B1 | * | 2/2001 | Anstotz ....................... | 141/98 |
| 6,186,272 B1 | * | 2/2001 | Atsalakis et al. ............ | 182/141 |
| 6,223,855 B1 | * | 5/2001 | Lindner ....................... | 182/131 |

* cited by examiner

Primary Examiner—J. Casimer Jacyna
(74) Attorney, Agent, or Firm—Charles L. Schwab; Nexsen Pruet Jacobs & Pollard, LLC

(57) ABSTRACT

A bulk unloading station is formed by two elongated modules stacked one on top of the other. Each module has a frame with pillars and when the upper module is stacked on the lower module the pillars on the upper module align with the pillars on the lower module. The modules are sized for shipment by truck or railroad car to the bulk unloading site. The lower module contains fluid transfer equipment. Unloading arms, with fluid conduits connectable to a fluid containing vehicle at one lateral side of the station, are mounted on the upper module. Conduits extending between the lower module and the upper module include removable segments at the juncture of the modules.

15 Claims, 3 Drawing Sheets

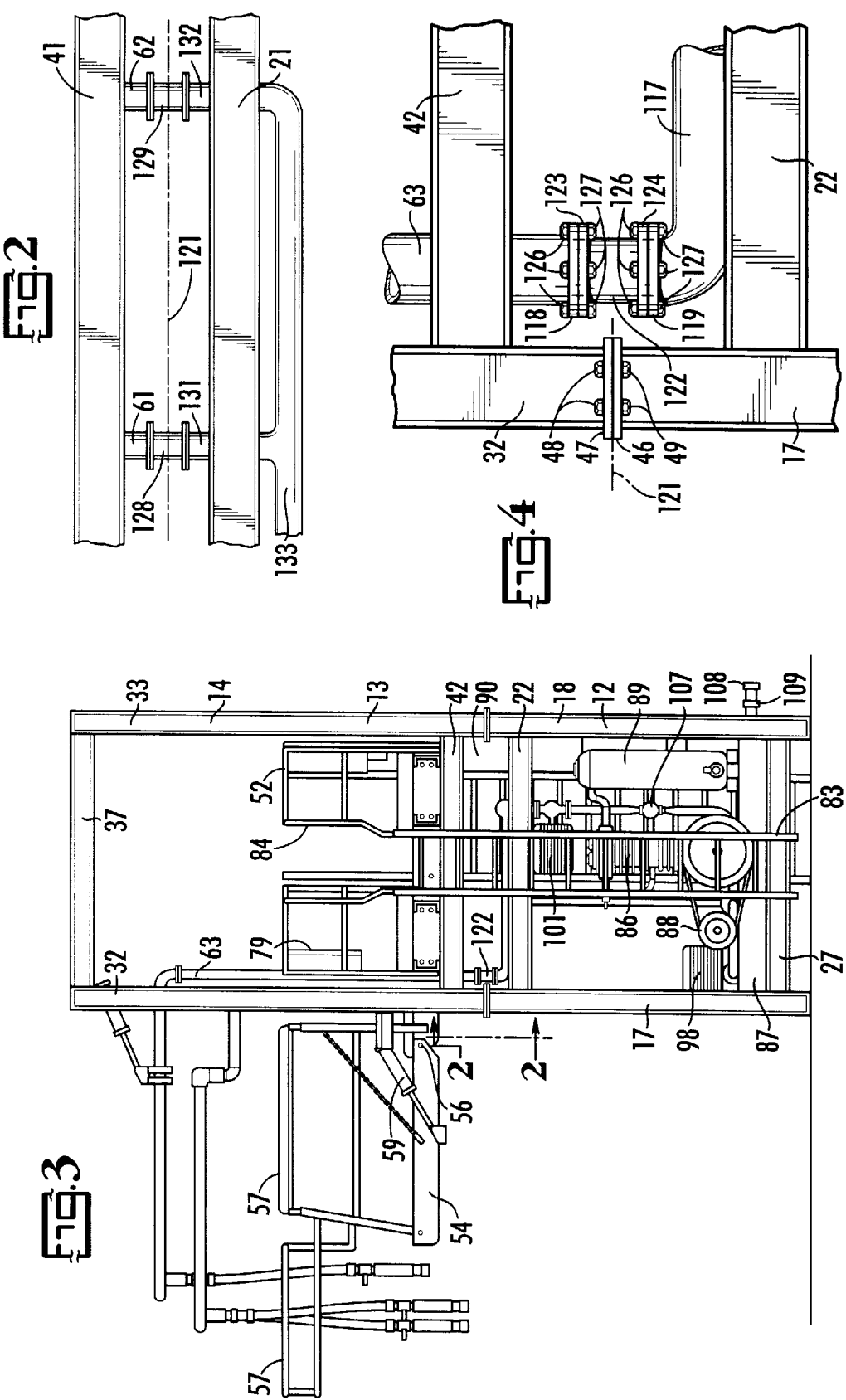

MODULAR BULK MATERIAL HANDLING STATION

TECHNICAL FIELD

This invention relates generally to equipment for movement of bulk material between a bulk material receiving vehicle and a storage facility and more particularly to a modular bulk material handling station containing the major power operated components for effecting such movement.

BACKGROUND ART

Structures have heretofore been provided to facilitate the loading and unloading of bulk material handling vehicles. U.S. Pat. Nos. 5,042,612 and 5,392,878, issued Aug. 27, 1991 and Feb. 28, 1995, respectively, to Ronald W. Bennett and Bruce A. Pech and both entitled Bulk Material Load Vehicle Access System, disclose an upstanding elongated structure having an elevated platform with a vertically moveable second platform cantilevered from one lateral side of the elongated structure. The second platform can be positioned over a bulk receiving vehicle thereby affording worker access to the top of the bulk receiving vehicle. The structures heretofore provided to facilitate the loading and unloading of bulk material receiving vehicles have been constructed on site because of the size of the structures. For instance such structures are substantially taller than a bulk material receiving railway car. On site construction and on site installation of bulk material handling equipment is not as efficient as factory construction and the on site working conditions, the lack of skilled local erection workers and adverse weather often cause delays in start-up and commissioning of the unloading station.

The present invention is directed to overcoming one or more of the problems as set forth above.

DISCLOSURE OF THE INVENTION

The modular bulk material handling station of this invention includes an elongated lower module and an elongated upper module. Process and electrical equipment for effecting and controlling flow of bulk material is installed on the lower module. The upper module is stacked on top of the lower module and includes a floor, a vertically adjustable worker platform at one lateral side of the upper module and swingable arms having fluid conduits adapted for connection to the bulk material receiving vehicle. The upper and lower modules are designed for manufacture at a factory and for transport to the erection site by railway flat cars or highway trucks. The conduits for carrying bulk material between the upper module and the lower module do not extend beyond the modules in their separated state and special connectors are provided to connect the conduits at the work site. The upper end of the lower module and the lower end of the upper module are provided with registrable connecting parts adapted for rigid connection to one another by suitable fasteners. An on site installed stairway and a built-in ladder provide dual access to the upper module.

BRIEF DESCRIPTION OF THE DRAWINGS

One embodiment of the invention is illustrated in the appended drawings, in which:

FIG. 2 is a partial side view of the unloading side of the station shown in FIG. 1;

FIG. 3 is an end view of the bulk material unloading station of FIG. 1;

FIG. 4 is a partial end view showing structural and piping connections and

BEST MODE FOR CARRYING OUT THE INVENTION

Figure 1:
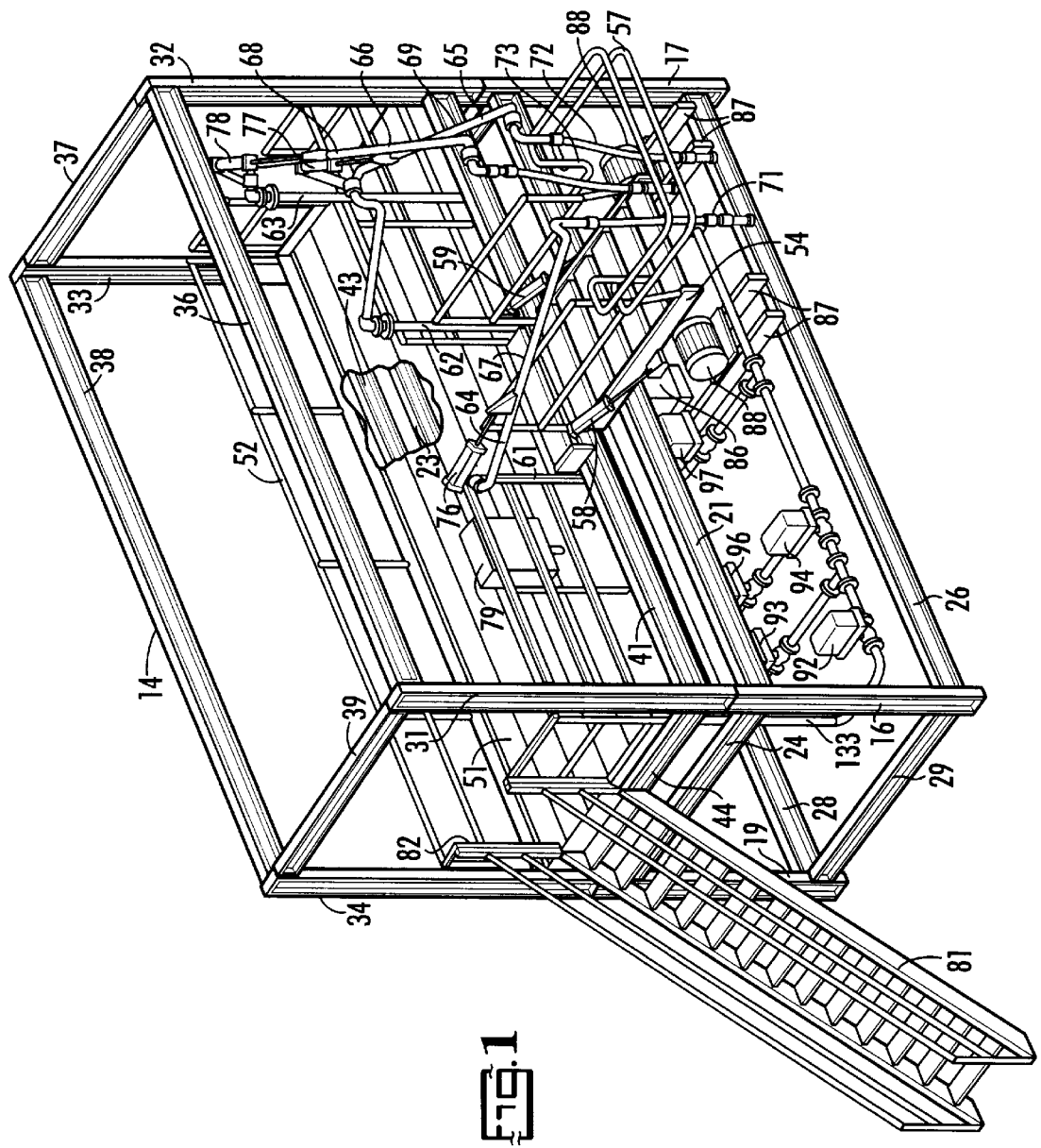
FIG. 1 is a perspective view of a bulk material unloading station.

As shown in FIGS. 1 through 4, a horizontally elongated modular bulk material unloading station is provided which includes a horizontally elongated lower module 11 having a frame 12 supporting a frame 13 of a horizontally elongated upper module 14. The frame 12 of the lower module 11 has four vertical H beam corner pillars 16, 17, 18, 19 defining a quadrilateral configuration. Upper horizontal H beams 21, 22, 23, 24 and lower horizontal H beams 26, 27, 28, 29 are rigidly secured at their ends, as by welding, to circumferentially adjacent pairs of the vertical corner pillars 16, 17, 18, 19 of the lower module frame 12. The frame 13 of the upper module 14 also has four H beam corner pillars 31, 32, 33, 34 to which upper horizontal H beams 36, 37, 38, 39 and lower horizontal H beams 41, 42, 43, 44 are rigidly secured, as by welding, to circumferentially adjacent pairs of the vertically extending corner pillars 31, 32, 33, 34. As shown in FIG. 4, a pair flanges 46, 47 with registering openings, not shown, are welded to the upper end of the pillar 17 and the lower end of the pillar 32, respectively, and are rigidly secured to one another by releasable fasteners in the form of bolts 48 and nuts 49. The upper ends of the other pillars 16, 18, 19 of the lower module 11 are secured to the lower ends of the pillars 31,33, 34 of the upper module 14 in the same manner. The lower ends of the pillars 16, 17, 18, 19 of the lower module 11 are provided with flanges having openings which permit attachment to an appropriate footing. The lower beams 41, 42, 43, 44 of the upper module 14 support a floor 51 and safety railing 52 around the floor 51.

Figure 5:
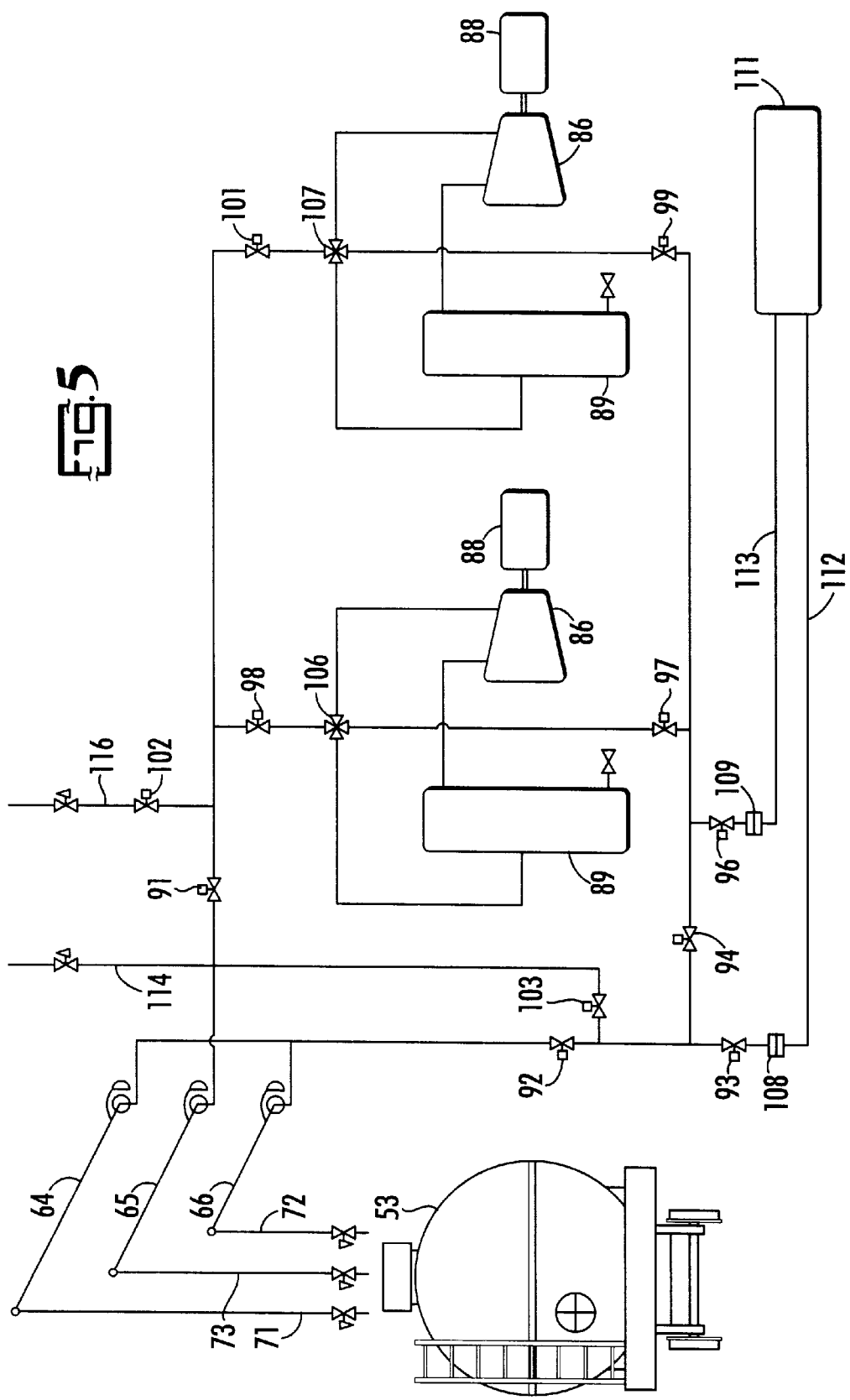
FIG. 5 is a schematic of the bulk material handling equipment included in the bulk material handling station.

In order to permit worker access to the top of a bulk containing vehicle 53, such as shown in FIG. 5, when the vehicle 53 is positioned at one of the laterally opposite sides of the unloading station, a human access platform 54 is provided which is pivotally connected to the bulk vehicle unloading side of the upper module 14 on a horizontal pivot axis 56 parallel to the vehicle unloading side. The platform 54 includes safety railing 57 at its opposite sides and extending in a loop outwardly beyond the platform 54 to provide security for workmen who step onto the fluid containing vehicle being unloaded. The platform 54 is raised and lowered by power operated actuators which may take the form of pneumatic cylinders 58, 59 interconnected between opposite sides of the platform 54 and brackets welded to the frame 13 of the upper module 14. The platform may also be raised and lowered manually, as by a manually operated winch.

Three upstanding fluid conveying pipes or conduits 61, 62, 63 are securely mounted on the upper module 14 and serve as supports for three unloading arms 64, 65, 66 in the form of conduits 67, 68, 69. Some installations may require only one or two unloading arms. Flexible hoses 71, 72, 73 are connected to the laterally outward ends of the conduits 67, 68, 69. The conduits 67, 68, 69 are connected to the vertical conduits 61, 62, 63 by fluid coupling components which permit vertical and horizontal swinging movement of the conduits 67, 68, 69 and power operated actuators in the form of pneumatic cylinders 76, 77, 78 are interconnected between the conduits 67, 68, 69 and coupling components which swing in a horizontal plane but not in a vertical plane. The pneumatic cylinders 58, 59, 76, 77, 78 are controlled by electrically operated pneumatic valves to which electricity is provided through an electrical panel 79 mounted on the upper module 14. The electric panel may also serve as a control panel. In some unloading stations the conduits 67, 68, 69 may be adjusted vertically by a manually operated mechanism.

Access to the upper module 14 is provided by a stairway 81 releasably secured by releasable fasteners, not shown, to one end of the elongated frame 13 of the upper module 14 at a gate 82 in the safety railing 52 and by a ladder 83 mounted on the other end of the elongated frame 13 at a gate 84 in the safety railing 52.

A pair of fluid movers 86 are mounted on sills or horizontal support beams 87 supported at their opposite ends by the beams 26, 28 of the frame 12 of the lower module 11. The fluid movers 86 are driven by electric motors 88 mounted on the support beams 87. A pair of fluid separators 89, only one of which is shown in FIG. 3, are also mounted on the support beams 87. An electric panel 90 is provided, as shown in FIG. 2, on the lower module 11 and an electric motor starter panel, not shown, is also installed on the lower module 11.

Referring also to FIG. 5, fluid handling equipment in the form of piping and electrically controlled and pneumatic actuated valves 91, 92, 93, 94, 96, 97, 98, 99. 101, 102 and 103 are mounted on the lower module 11 together with a pair of 4-way valves 106, 107. The piping interconnects the upright conduits 61, 62, 63, the valves 91–94, 96–99, 101–103, 106, 107 and a pair of fluid terminals 108, 109 on piping segments adjacent to and controlled by valves 93, 96. FIG. 5 illustrates, schematically, the fluid distribution arrangement of the modular bulk unloading station, together with a bulk containing vehicle 53 and a storage tank 111 connected to the terminals 108, 109 by fluid lines 112, 113. The unloading station may include separate unloading conduits 114, 116 for unloading fluid containing trucks, not shown. In preforming an unloading operation involving a pressurized liquid, the unloading arm hoses 71, 72 are connected to the liquid outlets of the tank on the bulk containing vehicle 53 and the unloading arm hose 73 is connected to a gas outlet on the tank of the bulk containing vehicle 53. The valves are adjusted so that the fluid movers 86 draw gas from the storage tank 111 via line 113 and the liquid separation tanks 89 and delivers compressed gas to the tank of the bulk material transport vehicle 53 by way of the hose 73. The compressed gas forces the pressurized liquid from the bulk material transport vehicle 53 via hoses 71, 72 and the piping, together with appropriate adjustment of the valves, delivers the liquid to the storage tank 111 via line 112.

As shown in FIG. 4, the upper module conduit 63 and a lower module conduit 117 terminate in flanges 118, 119 short of the juncture plane 121 and a tubular coupling segment in the form of a spool 122 having end flanges 123, 124 is inserted between the flanges 118 and 119. The flanges 118 and 123 have aligned openings receiving bolts 126 on which nuts 127 are threaded and flanges 119 and 124 are likewise provided with aligned openings through which bolts 126 extend and on which nuts 127 are threaded to releasably secure the spool 122 to the conduits 63 and 117.

FIG. 2 shows a pair of spools 128. 129 interconnecting the lower ends of the upper module conduits 61, 62 to upper ends of lower module branch conduits 131, 132 of a main conduit 133. The spool 128 is connected to the conduits 61 and 131 and the spool 129 is connected to the conduits 62 and 132 by releasable fastening members in the form of nuts and bolts in the same manner as spool 122 is connected to conduits 63 and 117. By terminating the conduits 61, 62, 63, 117, 131, 132 short of the extremity of the module on which they are mounted, the risk of damage to the conduits during shipment of the modules is greatly minimized.

INDUSTRIAL APPLICABILITY

A major advantage of the modular construction of the unloading station is good quality control. The lower and upper modules 11, 14, together with their fluid handling components including electric wiring, electric control and distribution panels and air lines, are fabricated, assembled and tested at a factory. Then the two modules are separated and shipped by truck or rail to the erection site. At the erection site a crane places the upper module 14 on top of the lower module 11 and the corner pillars are bolted together. The upper module conduits 61, 62, 63 are joined to the lower module conduits 128, 129, 117 by the spools 126, 127, 122 and electric and air connections are established to provide proper communication and power between the lower module and the upper module. After the upper module pillars are secured to the lower module pillars, the ladder 83 provides immediate and convenient human access to the floor 51 on the upper module 14 as well as providing an alternative exit from the floor 51 in case of emergencies. The stairway 81 is attached to the upper module 14 and provides a preferred and more convenient access to the floor 51.

By manufacturing and testing the modular unloading station at the factory, fabrication quality is easier to control, corrective work at the site is substantially eliminated, proper functioning of the components is insured prior to erection, erection delays heretofore experienced because of the delivery of the wrong or defective components from suppliers is eliminated. Also, delays due to inclement weather, or due to the unavailability of local skilled erection workers is minimized and the time required to complete on site installation is greatly reduced. Use of the module construction of this invention greatly reduces the time required for start-up and commissioning of the unloading station. By forming the unloading station in prefabricated modules, the damage incurred in shipping, unloading, storing and assembling components delivered for on site construction is avoided. Also the risk of damage due to vandalism and losses due to pilferage are reduced because the on site erection time is shorter when the modular design unloading station of this invention is used.

What is claimed is:

1. An upstanding and horizontally elongated modular bulk unloading station for transferring fluid from a fluid containing vehicle positioned at one lateral side of said station to a separate storage tank, said station comprising:

a lower module including a rigid frame, an upper module position directly above said lower module including a rigid frame releasably connected to said rigid frame of said lower module, a floor, a platform connected to said rigid frame of said upper module for swinging movement between a raised position and a lowered position directly above a fluid receiving vehicle positioned at said one side of said station permitting worker access to the top of said vehicle, a plurality of upper module conduits with vertically disposed upper and lower end portions, said upper end portions being spaced from one another along said one lateral side of said station and a loading arm for each of said upper module conduits swingingly mounted on said upper module, each arm including a fluid conduit connected in fluid conveying relation to said upper end portion of an associated upper module conduit and fluid handling equipment mounted on said lower module including at least one fluid terminal connectable to said storage tank and machinery required to move the fluid from said fluid containing vehicle to said storage tank via said outlet including a least one electric motor driven fluid mover, flow control valves and piping inter-connecting said upper module conduits, said fluid mover and said terminal.

2. The unloading station of claim 1 and further comprising at least one electric distribution panel on said lower module and at least one electric control panel on said upper module.

3. The unloading station of claim 1 wherein each of said modules have four corner pillars, said corner pillars of said upper module being aligned with and releasably secured to said four corner pillars, respectively, of said lower module.

4. The unloading station of claim 1 wherein said piping includes lower module conduits having vertically extending end portions aligned with said lower end portions of said upper module conduits, said end portions terminating short of the extremity of the frame of their associated module and further comprising connector spools connecting said upper end portions of said lower module conduits to said lower end portions of said upper module conduits.

5. The unloading station of claim 4 wherein said upper end portions of said lower module conduits, said lower end portions of said upper module conduits and the axially opposite ends of said connecter spools present flanges with openings through which releasable fasteners extend.

6. The unloading station of claim 1 and further comprising a stairway to said floor of said upper module.

7. The unloading station of claim 6 wherein said lower module includes a ladder at one of its longitudinally opposite ends affording human access to said upper module.

8. The unloading station of claim 1 wherein said frame of each of said modules includes four circumferentially positioned corner pillars and upper and lower horizontally disposed beams between circumferentially adjacent pairs of said pillars.

9. The unloading station of claim 8 and further comprising at least one power operated fluid mover supported by two of said lower beams of said lower module.

10. A modular bulk unloading station, comprising:

a horizontally elongated lower module having at least four vertical pillars defining a quadrilateral configuration and having horizontally extending flanges at their upper ends and horizontal beams rigidly interconnecting circumferentially adjacent pairs of said pillars, a horizontally elongated upper module having at least four vertical pillars aligned with said four pillars of said lower module and having horizontally extending flanges on their lower ends in registration with said flanges on said pillars of said lower module and horizontal beams rigidly interconnecting circumferentially adjacent pairs of said pillars of said upper module, releasable fasteners rigidly securing said registered flanges to one another and equipment for unloading fluid from a fluid containing vehicle positioned at one elongated side of said station including at least one unloading arm swingingly mounted on said one elongated side of said station and each having a conduit adapted for connection to said fluid containing vehicle, at least one fluid mover on said lower module, at least one fluid terminal on said lower module adapted for connection to a storage tank, valves mounted on said lower module and piping interconnecting said fluid mover, terminal, valves and conduits of said unloading arms.

11. The unloading station of claim 10 wherein said fluid mover is driven by an electric motor and further comprising an electrical distribution panel on said lower module and an electric control panel on said upper module.

12. The unloading station of claim 10 wherein said upper module includes a floor and further comprising a stairway to said floor at one end of said station.

13. The unloading station of claim 12 and further comprising a ladder secured to said lower module at the other end of said station, said ladder providing human access to said floor.

14. The unloading station of claim 10 wherein said piping includes vehicle unloading conduits extending, respectively, from said lower module to said conduits on said unloading arms, said vehicle unloading conduits each including a removable conduit segment bridging the juncture of said lower and upper modules.

15. The unloading station of claim 14 wherein said removable segments are spool shaped.

* * * * *